US012112711B1

(12) United States Patent
Chen et al.

(10) Patent No.: US 12,112,711 B1
(45) Date of Patent: Oct. 8, 2024

(54) PROCESSOR AND PIXEL DEGRADATION COMPENSATION METHOD THEREOF

(71) Applicant: Novatek Microelectronics Corp., Hsinchu (TW)

(72) Inventors: Li-Chieh Chen, Hsinchu (TW); Yen-Tao Liao, Hsinchu (TW)

(73) Assignee: Novatek Microelectronics Corp., Hsinchu (TW)

(*) Notice: Subject to any disclaimer, the term of this patent is extended or adjusted under 35 U.S.C. 154(b) by 0 days.

(21) Appl. No.: 18/454,083

(22) Filed: Aug. 23, 2023

(51) Int. Cl.
*G09G 3/3275* (2016.01)

(52) U.S. Cl.
CPC ... *G09G 3/3275* (2013.01); *G09G 2300/0819* (2013.01); *G09G 2320/0233* (2013.01); *G09G 2320/0242* (2013.01); *G09G 2320/045* (2013.01)

(58) Field of Classification Search
CPC ......... G09G 3/3275; G09G 2300/0819; G09G 2320/0233; G09G 2320/0242; G09G 2320/045
See application file for complete search history.

(56) References Cited

U.S. PATENT DOCUMENTS

| | | | | |
|---|---|---|---|---|
| 9,230,472 | B2 * | 1/2016 | Bae | G09G 3/3225 |
| 9,779,655 | B2 * | 10/2017 | Bae | G09G 3/3208 |
| 9,898,961 | B2 | 2/2018 | Jeong et al. | |
| 10,163,389 | B2 * | 12/2018 | An | G09G 3/3208 |
| 10,943,541 | B1 * | 3/2021 | Tan | G09G 3/32 |
| 11,164,543 | B1 * | 11/2021 | Gao | G09G 3/2074 |
| 11,244,612 | B2 * | 2/2022 | Ok | G09G 3/3233 |
| 11,398,173 | B2 * | 7/2022 | Han | G09G 3/32 |
| 11,670,231 | B2 * | 6/2023 | Ok | G09G 3/3233 345/204 |
| 2015/0187259 | A1 | 7/2015 | Jeong et al. | |
| 2017/0162103 | A1 * | 6/2017 | An | G09G 3/3208 |

(Continued)

FOREIGN PATENT DOCUMENTS

| | | |
|---|---|---|
| CN | 104751785 | 7/2017 |
| CN | 111986618 | 11/2020 |

OTHER PUBLICATIONS

"Office Action of Taiwan Counterpart Application", issued on Apr. 3, 2024, p. 1-p. 8.

*Primary Examiner* — Vinh T Lam
(74) *Attorney, Agent, or Firm* — JCIPRNET

(57) ABSTRACT

The disclosure provides a processor and a pixel degradation compensation method thereof. The processor includes a processing circuit and a pixel degradation compensation circuit. The pixel degradation compensation circuit generates a current degradation value based on current sub-pixel data. The current degradation value represents the degradation effect of the current sub-pixel data on a corresponding sub-pixel in a display module. The pixel degradation compensation circuit may adjust the current degradation value to generate an adjusted degradation value corresponding to the current sub-pixel data. The adjusted degradation value is accumulated to a total degradation value corresponding to the current sub-pixel data. The pixel degradation compensation circuit compensates the current sub-pixel data based on the total degradation value corresponding to the current sub-pixel data so as to generate compensated current sub-pixel data to the display module.

37 Claims, 13 Drawing Sheets

(56) References Cited

U.S. PATENT DOCUMENTS

| | | | | |
|---|---|---|---|---|
| 2020/0372861 | A1 | 11/2020 | Ok et al. | |
| 2021/0150964 | A1 * | 5/2021 | Li | G09G 3/3258 |
| 2022/0130332 | A1 | 4/2022 | Ok et al. | |
| 2022/0208056 | A1 * | 6/2022 | Baek | G09G 3/20 |

* cited by examiner

| | | | | | | | | |
|---|---|---|---|---|---|---|---|---|
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 0.7 | 0.7 | 0.7 | 1 | 1 | 1 | 1 | 1 |
| 1 | 0.7 | 0.5 | 0.7 | 1 | 1 | 1 | 1 | 1 |
| 1 | 0.7 | 0.7 | 0.7 | 1 | 1 | 1 | 1 | 1 |
| 1 | 1 | 1 | 1 | 1 | 1 | 1 | 1 | 1 |

FIG. 12

PROCESSOR AND PIXEL DEGRADATION COMPENSATION METHOD THEREOF

BACKGROUND

Technical Field

The disclosure relates to a display device, and in particular, to a processor and a pixel degradation compensation method thereof.

Description of Related Art

For organic light-emitting diode (OLED) displays, pixel degradation (or burn-in) is one of the many technical issues. Different operating temperatures, OLED materials, and driving currents may cause sub-pixels to suffer different degradation effects. A lookup table (LUT) established based on optical measurements for accumulation of decay factor (DF) and data compensation may overcome such a problem. In the case where the brightness of the sub-pixel is attenuated due to degradation, the brightness attenuation may be improved by appropriately increasing/compensating the digital value (grayscale value) of the sub-pixel data. For the degraded sub-pixels, the more severe the brightness attenuation, the greater the compensation value of the sub-pixel data (the additional compensation current applied to the degraded sub-pixels), so as to maintain the degraded sub-pixels at the target brightness. However, the upscaling space (compensation region) of sub-pixel data is limited.

However, the degradation speeds of red sub-pixels, green sub-pixels, and blue sub-pixels are different. FIG. 1 is a schematic diagram of characteristic curves of degradation speeds of different color sub-pixels of an OLED. The horizontal axis shown in FIG. 1 represents the usage time (in hours), and the vertical axis represents the normalized brightness. From the characteristic curves shown in FIG. 1, it may be seen that the degradation speed of the blue sub-pixel (characteristic curve B) is greater than the degradation speed of the red sub-pixel (characteristic curve R) and the degradation speed of the green sub-pixel (characteristic curve G). Compared to the red sub-pixel and the green sub-pixel, the compensation region (data upscaling space) of the blue sub-pixel may be saturated first. If the compensation region of any one color is saturated and the compensation region of the other color is not saturated, the display module may experience a color shift. That is to say, the display module continues to degrade, but the compensation region of some colors may not be effectively compensated due to saturation.

It should be noted that the content of the paragraph of "description of related art" is used to help understand the disclosure. Some (or all) of the content disclosed in the paragraph of "description of related art" may not be known to those with ordinary skill in the art. The content disclosed in the paragraph of "description of related art" does not mean that the content has been known to those with ordinary skill in the art prior to the application of the present application.

SUMMARY

The disclosure provides a processor and a pixel degradation compensation method thereof to compensate sub-pixel degradation.

In an embodiment of the disclosure, the above-mentioned processor includes a processing circuit and a pixel degradation compensation circuit. The pixel degradation compensation circuit is coupled to the processing circuit to receive a sub-pixel data stream. The pixel degradation compensation circuit is configured to compensate the sub-pixel data stream so as to generate a compensated sub-pixel data stream to the display module. The pixel degradation compensation circuit generates a current degradation value corresponding to current sub-pixel data based on the current sub-pixel data in the sub-pixel data stream. The current degradation value represents the degradation effect of the current sub-pixel data on a sub-pixel corresponding to the current sub-pixel data in the display module. The pixel degradation compensation circuit selectively adjusts the current degradation value to generate an adjusted degradation value. The pixel degradation compensation circuit accumulates the adjusted degradation value to the total degradation value corresponding to the current sub-pixel data. The pixel degradation compensation circuit compensates the current sub-pixel data based on the total degradation value corresponding to the current sub-pixel data so as to generate compensated current sub-pixel data in the compensated sub-pixel data stream to the display module.

In an embodiment of the disclosure, the above pixel degradation compensation method includes the following steps. A current degradation value corresponding to current sub-pixel data is generated based on the current sub-pixel data in a sub-pixel data stream. The current degradation value represents the degradation effect of the current sub-pixel data on a sub-pixel corresponding to the current sub-pixel data in a display module. The current degradation value is selectively adjusted to generate an adjusted degradation value. The adjusted degradation value is accumulated to a total degradation value corresponding to the current sub-pixel data. The current sub-pixel data is compensated based on the total degradation value corresponding to the current sub-pixel data so as to generate compensated current sub-pixel data in a compensated sub-pixel data stream to the display module.

Based on the above, the pixel degradation compensation circuit according to the embodiment of the disclosure may compensate the sub-pixel data stream of the processing circuit to generate the compensated sub-pixel data stream to the display module. In an embodiment, the pixel degradation compensation circuit may apply "dynamic decay factor accumulate speed" to compensate the sub-pixel degradation of the display module so as to overcome the technical issue of color shift. In detail, after the pixel degradation compensation circuit generates the current degradation value based on the current sub-pixel data, the pixel degradation compensation circuit may determine whether to adjust the current degradation value to be added to the total degradation value based on a margin of the compensation value in the compensation region (and/or based on a margin of the total degradation value in the total degradation value range) so as to slow down the accumulation speed of the degradation value before the compensation region is saturated (and/or before the total degradation value range is saturated). Based on this, the pixel degradation compensation circuit may slow down the saturation time of the compensation region (and/or the total degradation value range) to avoid the occurrence of color shift. In addition, the pixel degradation compensation circuit may slow down the accumulation speed of the total degradation value (reduce the additional compensation current for the sub-pixel) according to the situation to prolong the life of the sub-pixel.

In order to make the above-mentioned features and advantages of the disclosure clearer and easier to understand, the following embodiments are given and described in details the accompanying drawings as follows.

BRIEF DESCRIPTION OF THE DRAWINGS

FIG. 12 is a schematic diagram of a local adjustment of an accumulation speed weight of a sub-pixel array according to an embodiment of the disclosure.

DESCRIPTION OF THE EMBODIMENTS

Figure 1:
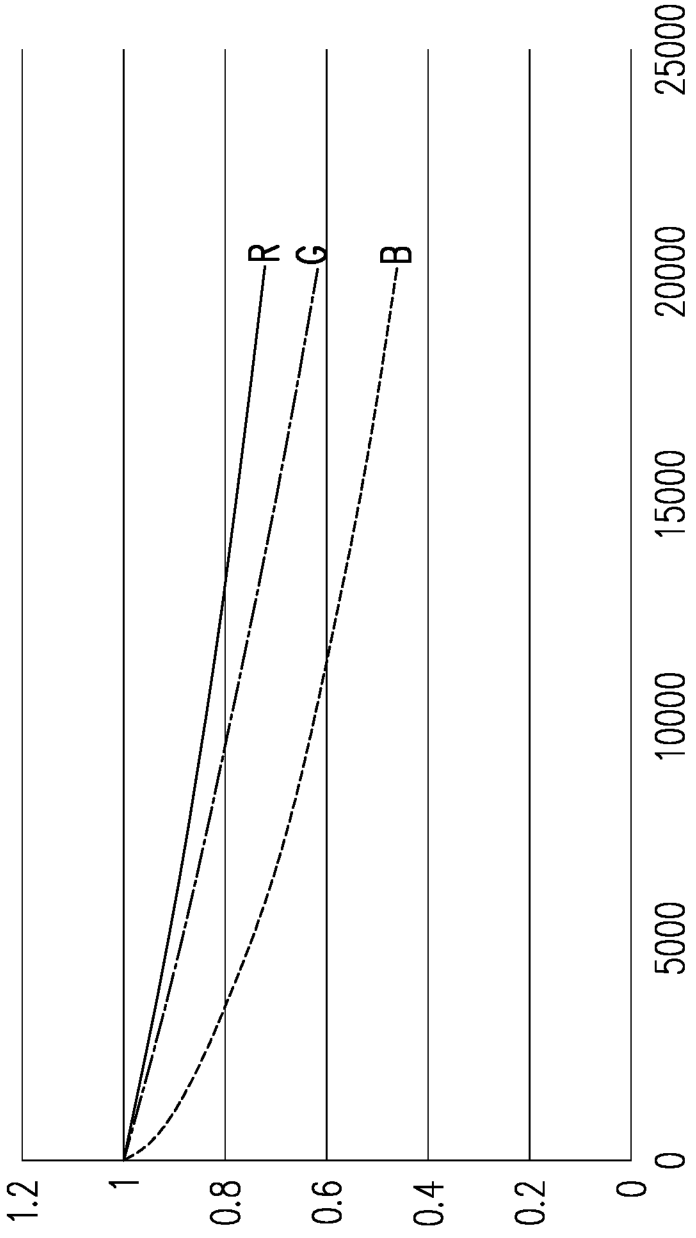
FIG. 1 (RELATED ART)
FIG. 1 is a schematic diagram of characteristic curves of degradation speeds of different color sub-pixels of an OLED.

The term "coupled (or connected)" used throughout the specification (including the claims) may refer to any direct or indirect means of connection. For example, if a first device is described as being coupled (or connected) to a second device, it should be interpreted that the first device may be directly connected to the second device, or the first device may be indirectly connected to the second device through other devices or some connection means. Terms such as "first" and "second" used throughout the specification (including the claims) are used to name elements, or to distinguish different embodiments or ranges, rather than to restrict the upper limit or the lower limit of the number of elements, nor are they intended to restrict the order of the elements. In addition, wherever possible, elements/components/steps using the same reference numerals in the drawings and embodiments represent the same or similar parts. Elements/components/steps that have the same reference numerals or names in different embodiments may serve as reference for each other.

Figure 2:
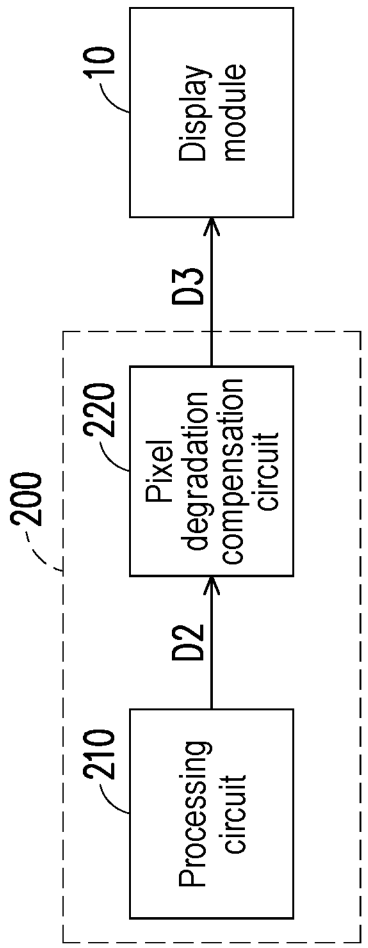
FIG. 2 is a schematic circuit block diagram of a display device according to an embodiment of the disclosure.

FIG. 2 is a schematic circuit block diagram of a display device according to an embodiment of the disclosure. The display device shown in FIG. 2 includes a display module 10 and a processor 200. Based on reality, the display module 10 may include an organic light-emitting diode (OLED) display panel or other display panels. Based on decay factors (DF) such as usage time, temperature, material, or driving current, different sub-pixels of the display module 10 may suffer from different degradation effects. In the case where the brightness of the sub-pixel is attenuated due to degradation, the actual brightness of the degraded sub-pixel may be lower than the target brightness.

In the embodiment shown in FIG. 2, the processor 200 includes a processing circuit 210 and a pixel degradation compensation circuit 220. According to different designs, in some embodiments, the implementation of the processor 200, the processing circuit 210, and (or) the pixel degradation compensation circuit 220 may be a hardware circuit. In other embodiments, the implementation of the processor 200, the processing circuit 210, and (or) the pixel degradation compensation circuit 220 may be firmware, software (that is, program), or a combination of the two. In some other embodiments, the implementation of the processor 200, the processing circuit 210, and (or) the pixel degradation compensation circuit 220 may be a combination of hardware, firmware, and software.

In terms of hardware, the processor 200, the processing circuit 210, and (or) the pixel degradation compensation circuit 220 may be implemented as a logic circuit on an integrated circuit. For example, the relevant functions of the processor 200, the processing circuit 210, and (or) the pixel degradation compensation circuit 220 may be implemented in one or more controllers, a microcontroller, a microprocessor, an application-specific integrated circuit (ASIC), a digital signal processor (DSP), a field programmable gate array (FPGA), a central processing unit (CPU), and/or various logic blocks, modules, and circuits in other processing units. The relevant functions of the processor 200, the processing circuit 210, and (or) the pixel degradation compensation circuit 220 may be implemented as hardware circuits by using hardware description languages (such as Verilog HDL or VHDL) or other suitable programming languages, such as various logic blocks, modules, and circuits in integrated circuits.

In terms of software and/or firmware, the related functions of the processor 200, the processing circuit 210, and (or) the pixel degradation compensation circuit 220 may be implemented as programming codes. For example, the processor 200, the processing circuit 210, and (or) the pixel degradation compensation circuit 220 are implemented by using general programming languages (such as C, C++, or combination language) or other suitable programming languages. The programming code may be recorded/stored in a "non-transitory machine-readable storage medium". In some embodiments, the non-transitory machine-readable storage medium includes, for example, a semiconductor memory and/or a storage device. An electronic device (such as a computer, a CPU, a controller, a processor, a microcontroller, or a microprocessor) may read and execute the programming code from the non-transitory machine-readable storage medium, thereby implementing the related functions of the processor 200, the processing circuit 210, and (or) the pixel degradation compensation circuit 220.

The pixel degradation compensation circuit 220 is coupled to the processing circuit 210 to receive a sub-pixel data stream D2. The pixel degradation compensation circuit 220 may compensate the sub-pixel data stream D2 to generate a compensated sub-pixel data stream D3 to the display module 10. The pixel degradation compensation circuit 220 may apply the technology of "dynamic decay factor accumulate speed" to compensate the sub-pixel degradation of the display module 10 so as to overcome the technical issue of color shift. A specific example of the technology of "dynamic decay factor accumulate speed" may be described below.

Figure 3:
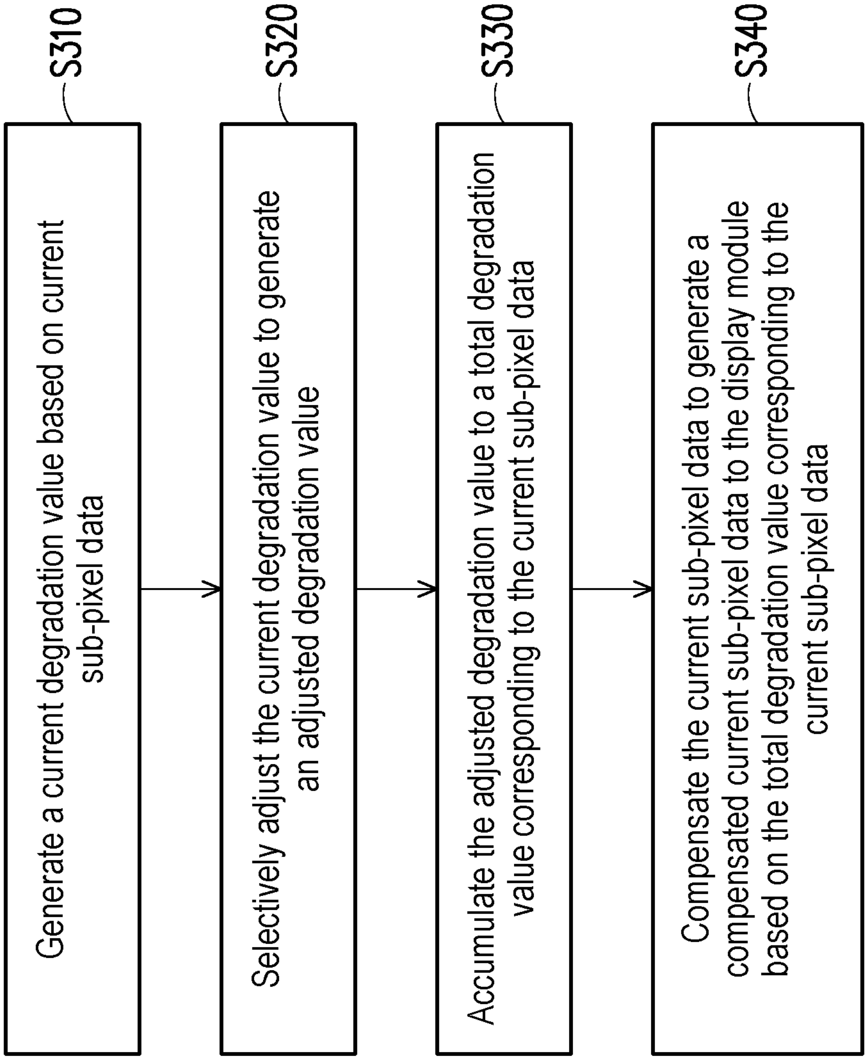
FIG. 3 is a schematic flow diagram of a pixel degradation compensation method according to an embodiment of the disclosure.

FIG. 3 is a schematic flow diagram of a pixel degradation compensation method according to an embodiment of the disclosure. Please refer to FIG. 2 and FIG. 3. In step S310, the pixel degradation compensation circuit 220 may generate a current degradation value corresponding to current sub-pixel data based on the current sub-pixel data in the sub-pixel data stream D2. The current degradation value represents the degradation effect of the current sub-pixel data (driving current) on a certain sub-pixel corresponding to the current sub-pixel data in the display module 10. The embodiment does not limit the calculation algorithm of the degradation value. For example, in step S310, the pixel degradation compensation circuit 220 may use a known algorithm or other algorithms to calculate the current degradation value corresponding to the current sub-pixel data based on at least one of many decay factors, such as sub-pixel data (driving current), usage time, or temperature.

The driving value range (total grayscale range) of the display module 10 may be divided into an image region and a compensation region. For example, assuming that the driving value range of the display module 10 is 0 to N, the grayscale range 0 to n may be defined as the image region, and the grayscale range n+1 to N may be defined as the compensation region, where n and N are integers determined according to actual design, and $0<n<N$. In step S320, the pixel degradation compensation circuit 220 may selectively adjust the current degradation value to generate an adjusted degradation value. The operation may be dynamically performed. For example (but not limited thereto), in the case that the compensation region has a sufficient margin (and/or a total degradation value range has a sufficient margin), the pixel degradation compensation circuit 220 may decide not to adjust the current degradation value. That is, the current degradation value is directly used as the adjusted degradation value. In the case where the margin of the compensation region is small (and/or the margin of the total degradation value range is small), the pixel degradation compensation circuit 220 may generate the adjusted degradation value that is less than the current degradation value.

In step S330, the pixel degradation compensation circuit 220 may accumulate the adjusted degradation value to the total degradation value corresponding to the current sub-pixel data. The pixel degradation compensation circuit 220 may save the total degradation value corresponding to each sub-pixel of the display module 10. For example, assuming that the display module 10 has x*y pixels and each pixel has three sub-pixels of different colors, the pixel degradation compensation circuit 220 may store x*y*3 total degradation values in a total degradation value lookup table (LUT). Each total degradation value represents the current degradation degree of a certain corresponding sub-pixel.

In step S340, based on the total degradation value corresponding to the current sub-pixel data, the pixel degradation compensation circuit 220 may compensate the current sub-pixel data to generate compensated current sub-pixel data in the compensated sub-pixel data stream D3 to the display module 10. For example, a compensation value lookup table prepared in advance based on the actual design may be configured in the pixel degradation compensation circuit 220. The pixel degradation compensation circuit 220 may search the compensation value lookup table based on the total degradation value corresponding to the current sub-pixel data so as to obtain a compensation value corresponding to the total degradation value. The pixel degradation compensation circuit 220 may use the compensation value to compensate the current sub-pixel data so as to generate the compensated current sub-pixel data. Therefore, when the brightness of the sub-pixel is attenuated due to degradation, the degraded sub-pixel may be maintained at the target brightness by appropriately increasing/compensating the digital value (grayscale value) of the sub-pixel data.

To sum up, the pixel degradation compensation circuit 220 of the embodiment may compensate the sub-pixel data stream D2 of the processing circuit 210 to generate the compensated sub-pixel data stream D3 to the display module 10. After the pixel degradation compensation circuit 220 generates the current degradation value based on the current sub-pixel data, the pixel degradation compensation circuit 220 may determine whether to adjust the current degradation value to be added to the total degradation value based on the margin of the compensation value in the compensation region (and/or the margin of the total degradation value in the total degradation value range) so as to slow down the accumulation speed of the degradation value before the compensation region is saturated (and/or before the total degradation value range is saturated). Therefore, the pixel degradation compensation circuit 220 may apply the technology of "dynamic attenuation factor accumulation speed" to compensate the sub-pixel degradation of the display module. Based on this, the pixel degradation compensation circuit 220 may slow down the saturation time of the compensation region (and/or the total degradation value range) to avoid the occurrence of color shift. In addition, the pixel degradation compensation circuit 220 may slow down the accumulation speed of the total degradation value (reduce the increase in the additional compensation current for the sub-pixel) according to the situation to prolong the life of the sub-pixel.

Figure 4:
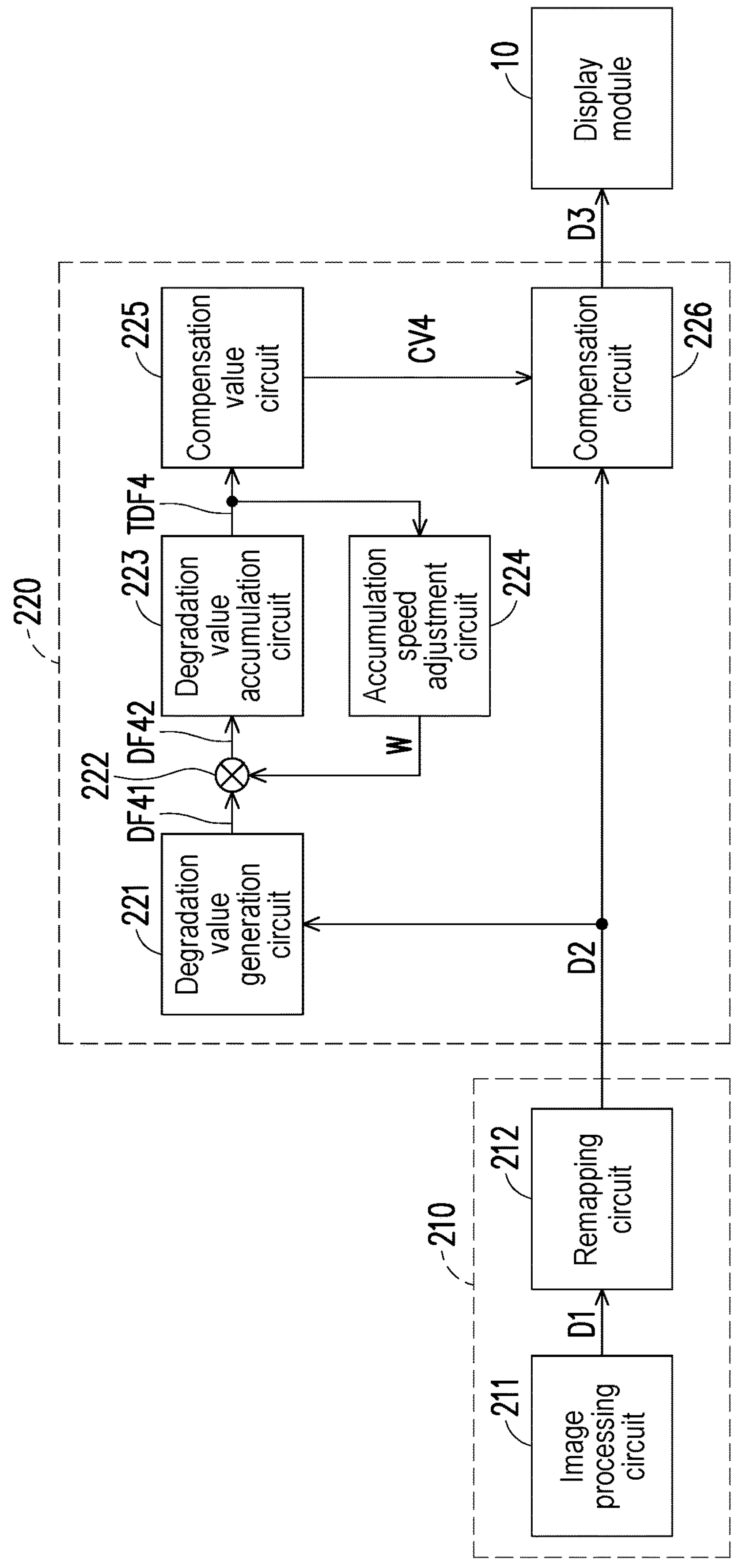
FIG. 4 is a schematic circuit block diagram of a processing circuit and a pixel degradation compensation circuit according to an embodiment of the disclosure.

FIG. 4 is a schematic circuit block diagram of the processing circuit 210 and the pixel degradation compensation circuit 220 according to an embodiment of the disclosure. The processing circuit 210 and the pixel degradation compensation circuit 220 shown in FIG. 4 may be used as one of many implementation examples of the processing circuit 210 and the pixel degradation compensation circuit 220 shown in FIG. 2. For the display module 10, the processing circuit 210, and the pixel degradation compensation circuit 220 shown in FIG. 4, reference may be made to the relevant descriptions of FIG. 2 and FIG. 3, so the details are not repeated here. In the embodiment shown in FIG. 4, the processing circuit 210 includes an image processing circuit 211 and a remapping circuit 212, and the pixel degradation compensation circuit 220 includes a degradation value generation circuit 221, a multiplication circuit 222, a degradation value accumulation circuit 223, an accumulation speed adjustment circuit 224, a compensation value circuit 225, and a compensation circuit 226.

Figure 5:
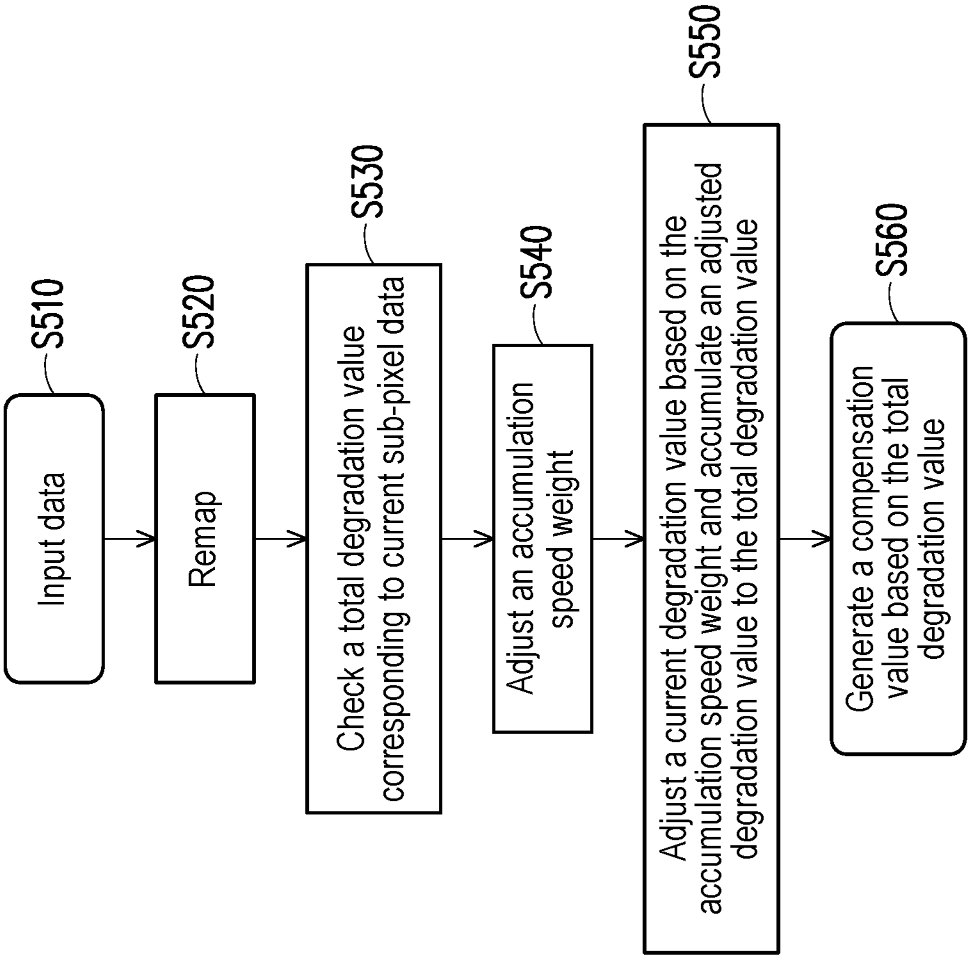
FIG. 5 is a schematic flow diagram of a pixel degradation compensation method according to another embodiment of the disclosure.

FIG. 5 is a schematic flow diagram of a pixel degradation compensation method according to another embodiment of the disclosure. Please refer to FIG. 4 and FIG. 5. In step S510, an output data (an original data stream D1) of the image processing circuit 211 is input into the remapping circuit 212. The remapping circuit 212 is coupled to the image processing circuit 211 to receive the original data stream D1. In step S520, the remapping circuit 212 remaps the original data stream D1 to the sub-pixel data stream D2.

Figure 6:
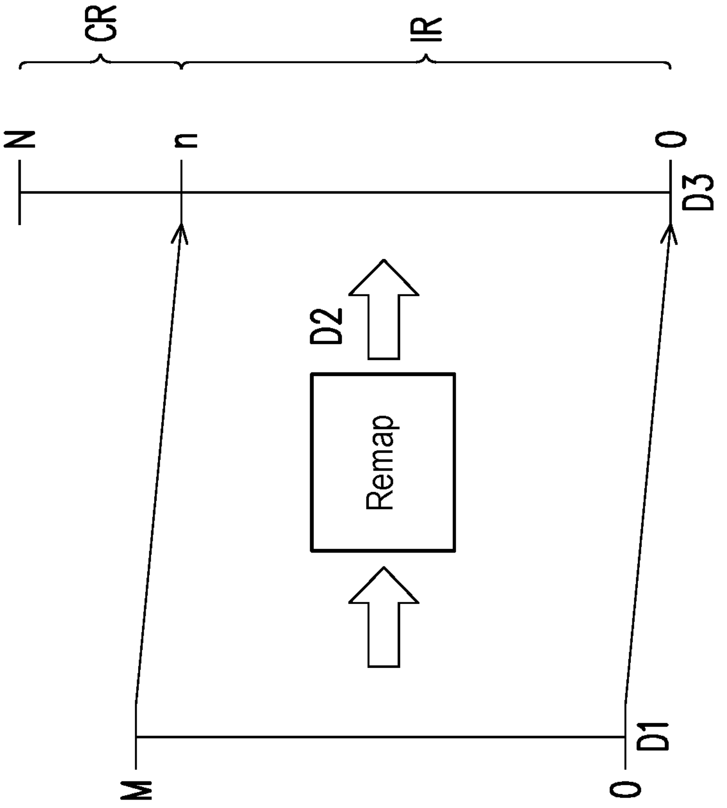
FIG. 6 is a schematic diagram of a remapping of an original data stream to a sub-pixel data stream according to an embodiment of the disclosure.

FIG. 6 is a schematic diagram of a remapping of the original data stream D1 to the sub-pixel data stream D2 according to an embodiment of the disclosure. The vertical axis of FIG. 6 represents grayscales. The left part of FIG. 6 shows the value range (total grayscale range) of the original data stream D1. In the embodiment shown in FIG. 6, the value range of the original data stream D1 is assumed to be 0 to M, wherein M is an integer determined according to actual design. The right part of FIG. 6 shows the driving value range (total grayscale range) of the display module 10, that is, the value range of the compensated sub-pixel data stream D3. The driving value range of the display module 10 may be divided into an image region IR and a compensation region CR. For example, assuming that the driving value range of the display module 10 is 0 to N, the grayscale range 0 to n may be defined as the image region IR, and the grayscale range n+1 to N may be defined as the compensation region CR, where n and N are integers determined according to actual design, and $0<n<N$. The remapping circuit 212 remaps the original data stream D1 to a sub-pixel data stream D2. Each sub-pixel data in the sub-pixel data stream D2 belongs to the image region IR.

Please refer to FIG. 4 and FIG. 5. The degradation value generation circuit 221 is coupled to the processing circuit 210 to receive the sub-pixel data stream D2. The degradation value generation circuit 221 may generate a current degradation value DF41 corresponding to the current sub-pixel data based on the current sub-pixel data in the sub-pixel data stream D2. The current degradation value DF41 indicates the degradation effect of the current sub-pixel data (driving current) on a corresponding sub-pixel in the display module 10. The embodiment does not limit the calculation algorithm of the degradation value. For example, the degradation value generation circuit 221 may use a known algorithm or other algorithms to calculate the current degradation value DF41 corresponding to the current sub-pixel data based on at least one of many decay factors such as sub-pixel data (driving current), usage time, or temperature.

The multiplication circuit 222 is coupled to the degradation value generation circuit 221 to receive the current degradation value DF41. The multiplication circuit 222 may adjust the current degradation value DF41 based on an accumulation speed weight W to generate an adjusted degradation value DF42 corresponding to the current sub-pixel data. For example (but not limited thereto), when the total degradation value range has a sufficient margin, the accumulation speed weight W is "1", so the multiplication circuit 222 directly uses the current degradation value DF41 as the adjusted degradation value DF42. When there is little margin in the total degradation value range, the accumulation speed weight W is less than 1, so the multiplication circuit 222 may generate an adjusted degradation value DF42 that is less than the current degradation value DF41.

The degradation value accumulation circuit 223 is coupled to the multiplication circuit 222 to receive the adjusted degradation value DF42. The degradation value accumulation circuit 223 may accumulate the adjusted degradation value DF42 corresponding to the current sub-pixel data to a total degradation value TDF4 corresponding to the current sub-pixel data. The degradation value accumulation circuit 223 may save the total degradation value TDF4 corresponding to each sub-pixel of the display module 10. For example, assuming that the display module 10 has x*y pixels and each pixel has three sub-pixels of different colors, the degradation value accumulation circuit 223 may store x*y*3 total degradation values in the total degradation value lookup table. Each total degradation value represents the current degradation degree of a certain corresponding sub-pixel.

The accumulation speed adjustment circuit 224 is coupled to the degradation value accumulation circuit 223 to receive the total degradation value TDF4. In any case, the total degradation value range of the total degradation value TDF4 is limited. For example, the memory used to store the total degradation value lookup table is limited, so the limited value range of the total degradation value TDF4 may be saturated. For another example, the number of bits of the total degradation value TDF4 is limited, so the limited value range of the total degradation value TDF4 may be saturated. In step S530, the accumulation speed adjustment circuit 224 of the pixel degradation compensation circuit 220 may check the margin in the total degradation value range of the total degradation value TDF4 corresponding to each sub-pixel data in an image frame of the sub-pixel data stream D2 so as to obtain the check result. In step S540, the accumulation speed adjustment circuit 224 may adjust the accumulation speed weight W corresponding to the current sub-pixel data based on the check result of the total degradation value TDF4.

In an embodiment, the accumulation speed adjustment circuit 224 may adjust the accumulation speed weight W to be the first weight value, in response to the check result indicating that the margin of the total degradation value TDF4 in the total degradation value range corresponding to any sub-pixel data in the image frame is greater than the first threshold value. The first threshold value may be determined according to actual design. The accumulation speed adjustment circuit 224 may adjust the accumulation speed weight W to the second weight value less than the first weight value, in response to the check result indicating that the margin of the total degradation value TDF4 in the total degradation value range corresponding to any sub-pixel data in the image frame is less than the first threshold value. The first weight value the second weight value may be determined according to actual design. For example, the first weight value is 1, and the second weight value is a positive number less than 1.

In another embodiment, the accumulation speed adjustment circuit 224 may adjust the accumulation speed weight W to be the second weight value, in response to the check result indicating that the margin of the total degradation value TDF4 in the total degradation value range corresponding to any sub-pixel data in the image frame is less than the first threshold value and greater than the second threshold value. The first threshold value and the second threshold value may be determined according to actual design. The first threshold value is greater than the second threshold value. The accumulation speed adjustment circuit 224 may adjust the accumulation speed weight W to be the third weight value less than the second weight value, in response to the check result indicating that the margin of the total degradation value TDF4 in the total degradation value range corresponding to any sub-pixel data in the image frame is less than the second threshold value. The second weight value and the third weight value may be determined according to actual design.

Figure 7:
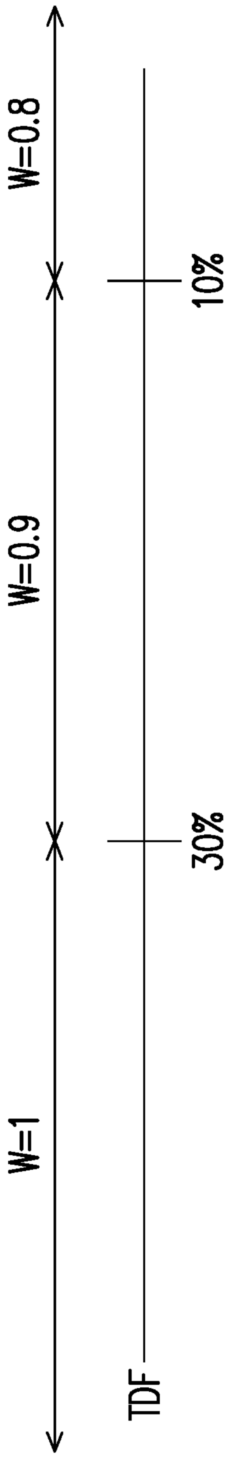
FIG. 7 is a schematic diagram of a margin of a total degradation value range according to an embodiment of the disclosure.

For example, FIG. 7 is a schematic diagram of a total degradation value range according to an embodiment of the disclosure. The horizontal axis of FIG. 7 represents the total degradation value (TDF). The accumulation speed adjustment circuit 224 may decide whether to adjust the accumulation speed weight W to the multiplication circuit 222 based on the margin of the total degradation value TDF4 in the total degradation value range. For example, if the margins of the total degradation value TDF4 of all sub-pixels in the total degradation value range are more than 30%, indicating that there is a sufficient margin in the total degradation value range, the accumulation speed adjustment circuit 224 may set the accumulation speed weight W to "1". If the margin of the total degradation value TDF4 of any sub-pixel in the total degradation value range is less than 30% but more than 10%, the accumulation speed adjustment circuit 224 may set the accumulation speed weight W to "0.9". If the margin of the total degradation value TDF4 of any sub-pixel in the total degradation value range is less than 10%, the accumulation speed adjustment circuit 224 may set the accumulation speed weight W to "0.8".

Please refer to FIG. 4 and FIG. 5. In the implementation example of "Global", the same accumulation speed weight W applies to the degradation value corresponding to each sub-pixel data in the same image frame. In step S550, the multiplication circuit 222 of the pixel degradation compensation circuit 220 adjusts the current degradation value DF41 based on the accumulation speed weight W to generate the adjusted degradation value DF42 corresponding to the current sub-pixel data. In step S550, the degradation value accumulation circuit 223 may accumulate the adjusted degradation value DF42 corresponding to the current sub-pixel data to the total degradation value TDF4 corresponding to the current sub-pixel data. Therefore, before the total degradation value range of any one of the total degradation values TDF4 is saturated, the accumulation speed adjustment circuit 224 may slow down the accumulation speed of the degradation value.

The compensation value circuit 225 is coupled to the degradation value accumulation circuit 223 to receive the total degradation value TDF4. In step S560, the compensation value circuit 225 generates a compensation value CV4 corresponding to the current sub-pixel data based on the total degradation value TDF4. The embodiment does not limit the calculation algorithm of the compensation value. For example, the compensation value circuit 225 may use a known algorithm or other algorithms to convert the total degradation value TDF4 into the compensation value CV4. For another example, the compensation value circuit 225 can obtain the compensation value CV4 from a lookup table based on the total degradation value TDF4. The compensation circuit 226 is coupled to the processing circuit 210 to receive the sub-pixel data stream D2. The compensation circuit 226 is coupled to the compensation value circuit 225 to receive the compensation value CV4. In step S560, the compensation circuit 226 compensates the current sub-pixel data in the sub-pixel data stream D2 based on the compensation value CV4 to generate the compensated current sub-pixel data to the display module 10. For example, the compensation circuit 226 may add the compensation value CV4 to the current sub-pixel data in a compensated sub-pixel data stream D2 to generate the compensated current sub-pixel data to the display module 10.

Figure 8:
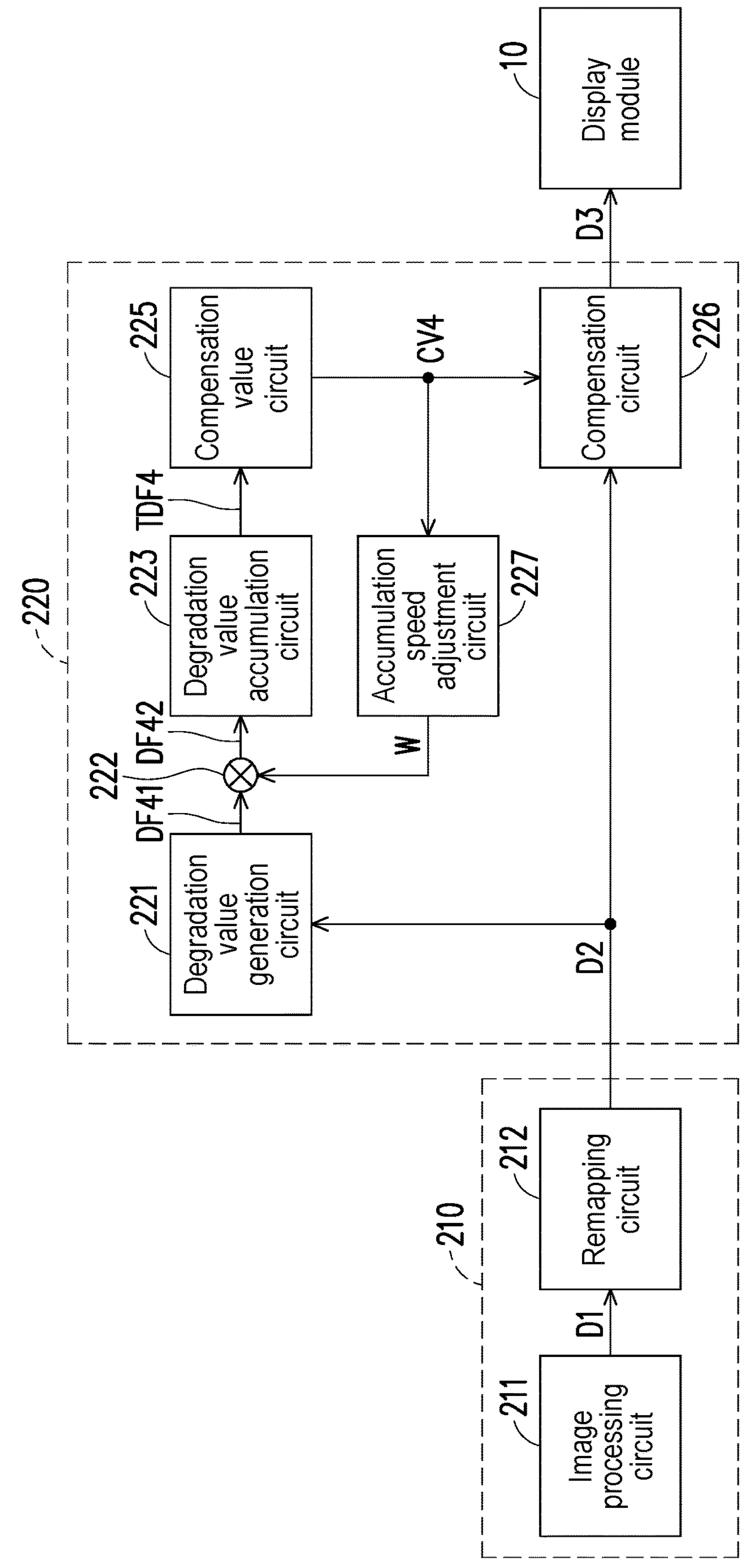
FIG. 8 is a schematic circuit block diagram of a processing circuit and a pixel degradation compensation circuit according to another embodiment of the disclosure.

FIG. 8 is a schematic circuit block diagram of the processing circuit 210 and the pixel degradation compensation circuit 220 according to another embodiment of the disclosure. The processing circuit 210 and the pixel degradation compensation circuit 220 shown in FIG. 8 may be used as one of many implementation examples of the processing circuit 210 and the pixel degradation compensation circuit 220 shown in FIG. 2. For the display module 10, the processing circuit 210, and the pixel degradation compensation circuit 220 shown in FIG. 8, reference may be made to the relevant descriptions of FIG. 2 and FIG. 3, so the details are not repeated here. In the embodiment shown in FIG. 8, the processing circuit 210 includes the image processing circuit 211 and the remapping circuit 212, and the pixel degradation compensation circuit 220 includes the degradation value generation circuit 221, the multiplication circuit 222, the degradation value accumulation circuit 223, the compensation value circuit 225, the compensation circuit 226, and an accumulation speed adjustment circuit 227. For the image processing circuit 211 and the remapping circuit 212 shown in FIG. 8, reference may be made to the relevant descriptions of FIG. 4 and FIG. 6. For the degradation value generation circuit 221, the multiplication circuit 222, the degradation value accumulation circuit 223, the compensation value circuit 225, and the compensation circuit 226, reference may be made to the relevant descriptions of FIG. 4 and FIG. 6, so the details are not repeated here.

The compensation value circuit 225 generates the compensation value CV4 corresponding to the current sub-pixel data based on the total degradation value TDF4. The accumulation speed adjustment circuit 227 adjusts the accumulation speed weight W to the multiplication circuit 222 based on the compensation value CV4. The compensation circuit 226 compensates the current sub-pixel data in the sub-pixel data stream D2 based on the compensation value CV4 to generate the compensated current sub-pixel data to the display module 10. For example, the compensation circuit 226 may add the compensation value CV4 to the current sub-pixel data in the compensated sub-pixel data stream D2 so as to generate the compensated current sub-pixel data to the display module 10. That is, the compensated sub-pixel data stream D3 may use the compensation region CR for the additional compensation current applied to the degraded sub-pixel. However, the upscaling space (compensation region CR) of the compensated current sub-pixel data is limited.

Figure 9:
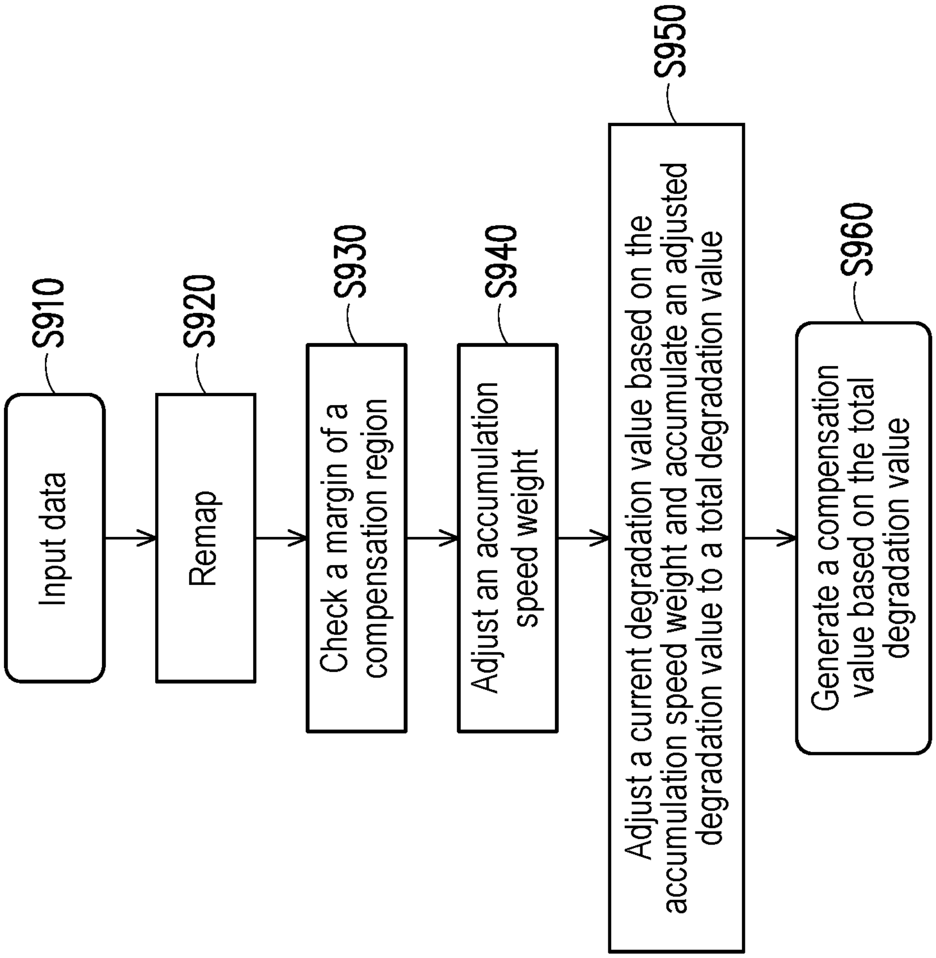
FIG. 9 is a schematic flow diagram of a pixel degradation compensation method according to still another embodiment of the disclosure.

FIG. 9 is a schematic flow diagram of a pixel degradation compensation method according to still another embodiment of the disclosure. For step S910 and step S920 shown in FIG. 9, reference may be made to the relevant descriptions of step S510 and step S520 shown in FIG. 5. For steps S940, S950, and S960 shown in FIG. 9, reference may be made to the relevant descriptions of step S540, S550, and S560, so the details are not repeated here. Please refer to FIG. 8 and FIG. 9. The accumulation speed adjustment circuit 227 is coupled to the compensation value circuit 225 to receive the compensation value CV4. In step S930, the accumulation speed adjustment circuit 227 of the pixel degradation compensation circuit 220 may check the margin of the compensation value CV4 in the compensation region CR corresponding to each sub-pixel data in the image frame of the sub-pixel data stream D2 to obtain the check result. In step S940, the accumulation speed adjustment circuit 227 may adjust the accumulation speed weight W corresponding to the current sub-pixel data based on the check result of the compensation value CV4 (the margin of the compensation region CR). The multiplication circuit 222 adjusts the current degradation value DF41 based on the accumulation speed weight W to generate the adjusted degradation value DF42 corresponding to the current sub-pixel data.

In an embodiment, the accumulation speed adjustment circuit 227 adjusts the accumulation speed weight W to be the first weight value, in response to the check result indicating that the margin of the compensation value CV4 in the compensation region CR corresponding to any sub-pixel data in the image frame is greater than the first threshold value. The first threshold value may be determined according to actual design. The accumulation speed adjustment circuit 227 adjusts the accumulation speed weight W to be the second weight value less than the first weight value, in response to the check result indicating that the margin of the compensation value CV4 in the compensation region CR corresponding to any sub-pixel data in the image frame is less than the first threshold value. The first weight value and the second weight value may be determined according to actual design. For example, the first weight value is 1, and the second weight value is a positive number less than 1.

In another embodiment, the accumulation speed adjustment circuit 227 adjusts the accumulation speed weight W to be the second weight value, in response to the check result indicating that the margin of the compensation value CV4 in the compensation region CR corresponding to any sub-pixel data in the image frame is less than the first threshold value and greater than the second threshold value. The first threshold value and the second threshold value may be determined according to actual design. The first threshold value is greater than the second threshold value. The accumulation speed adjustment circuit 227 adjusts the accumulation speed weight W to be the third weight value less than the second weight value, in response to the check result indicating that the margin of the compensation value CV4 in the compensation region CR corresponding to any sub-pixel data in the image frame is less than the second threshold value. The second weight value and the third weight value may be determined according to actual design.

Figure 10:
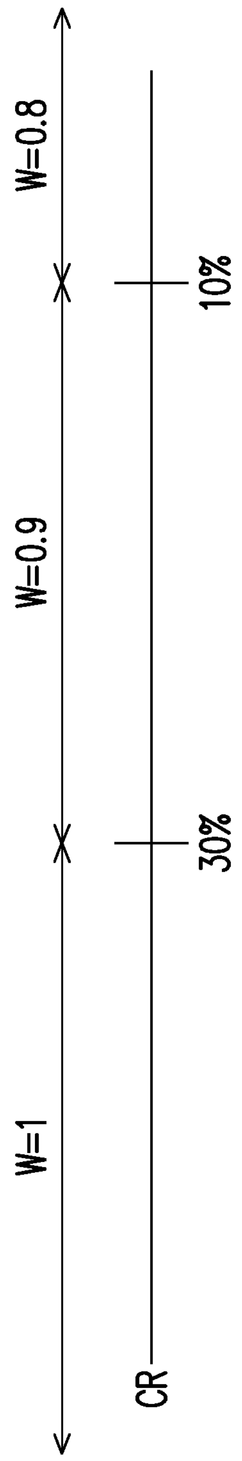
FIG. 10 is a schematic diagram of a margin of a compensation region according to an embodiment of the disclosure.

For example, FIG. 10 is a schematic diagram of the margin of the compensation region CR according to an embodiment of the disclosure. The horizontal axis of FIG. 10 represents the margin of the compensation region CR. The accumulation speed adjustment circuit 227 may determine whether to adjust the accumulation speed weight W to the multiplication circuit 222 based on the margin of the compensation value CV4 in the compensation region CR. For example, if the margins of the compensation values CV4 of all sub-pixels in the compensation region CR are more than 30%, indicating that there is a sufficient margin in the compensation region CR, the accumulation speed adjustment circuit 227 may set the accumulation speed weight W to "1". If the margin of the compensation value CV4 of any sub-pixel in the compensation region CR is less than 30% but more than 10%, the accumulation speed adjustment circuit 227 may set the accumulation speed weight W to "0.9". If the margin of the compensation value CV4 of any sub-pixel in the compensation region CR is less than 10%, the accumulation speed adjustment circuit 227 may set the accumulation speed weight W to "0.8". In the implementation example of "Global", the same accumulation speed weight W applies to the degradation value corresponding to each sub-pixel data in the same image frame.

Figure 11:
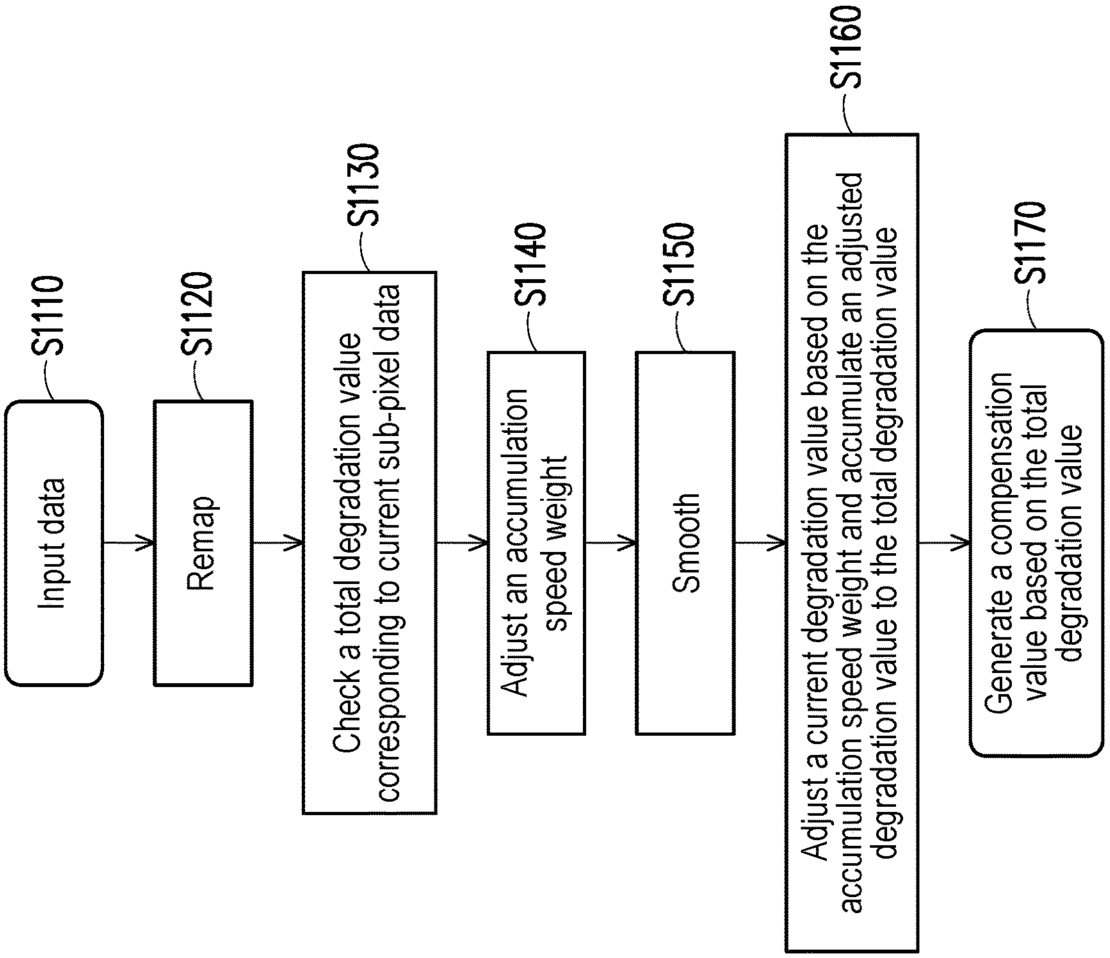
FIG. 11 is a schematic flow diagram of a pixel degradation compensation method according to yet another embodiment of the disclosure.

FIG. 11 is a schematic flow diagram of a pixel degradation compensation method according to yet another embodiment of the disclosure. For steps S1110, S1120, S1130, S1140, S1160, and S1170 shown in FIG. 11, reference may be made to the relevant descriptions of steps S510, S520, S530, S540, and S550, and step S560 shown in FIG. 5, so the details are not repeated here. Please refer to FIG. 4 and FIG. 11. In step S1130, the accumulation speed adjustment circuit 224 may check the margin of the total degradation value TDF4 in the total degradation value range corresponding to the current sub-pixel data of the sub-pixel data stream D2 to obtain the check result. In step S1140, the accumulation speed adjustment circuit 224 may adjust the accumulation speed weight W corresponding to the current sub-pixel data based on the check result of the total degradation value TDF4. The multiplication circuit 222 adjusts the current degradation value DF41 based on the accumulation speed weight W to generate the adjusted degradation value DF42 corresponding to the current sub-pixel data.

In the implementation example of "Local", the accumulation speed weight W corresponding to different sub-pixel data in the same image frame may be different. In an embodiment, the accumulation speed adjustment circuit 224 may adjust the accumulation speed weight W corresponding to the current sub-pixel data to be the first weight value, in response to the check result indicating that the margin of the total degradation value TDF4 in the total degradation value range corresponding to the current sub-pixel data is greater than the first threshold value. The first threshold value may be determined according to actual design. The accumulation speed adjustment circuit 224 may adjust the accumulation speed weight W corresponding to the current sub-pixel data to be the second weight value less than the first weight value, in response to the check result indicating that the margin of the total degradation value TDF4 in the total degradation value range corresponding to the current sub-pixel data is less than the first threshold value. The first weight value and the second weight value may be determined according to actual design. For example, the first weight value is 1, and the second weight value is a positive number less than 1. The accumulation speed weight W corresponding to at least one adjacent sub-pixel data near the current sub-pixel data in the image frame is adjusted to be the third weight value less than the first weight value and greater than the second weight value, in response to the accumulation speed weight W corresponding to the current sub-pixel data being adjusted to the second weight value.

FIG. 12 is a schematic diagram of a local adjustment of the accumulation speed weight W of a sub-pixel array according to an embodiment of the disclosure. FIG. 12 shows a display panel (display module) with 9*9 sub-pixels, where each number represents the accumulation speed weight W corresponding to the sub-pixel. In the embodiment shown in FIG. 12, assuming that the margin of the total degradation value TDF4 in the total degradation value range corresponding to the sub-pixel in the seventh row and the third column is less than a certain threshold (determined by the actual design), the accumulation speed weight W corresponding to the sub-pixel is adjusted to "0.5". In addition, assuming that that the margins of the total degradation value TDF4 in the total degradation value range corresponding to other sub-pixels is greater than a certain threshold (determined by the actual design), the accumulation speed weight W corresponding to the sub-pixels may be maintained as "1".

Please refer to FIG. 11 and FIG. 12. In step S1150, the accumulation speed adjustment circuit 224 may perform smoothing on the accumulation speed weight W of one or more adjacent sub-pixels near the sub-pixel in the seventh row and the third column based on the accumulation speed weight W of "0.5" corresponding to the sub-pixel in the seventh row and the third column and the accumulation speed weight W of "1" corresponding to the other sub-pixels. For example, the accumulation speed weight W corresponding to at least one adjacent sub-pixel data near the current sub-pixel data in the image frame is adjusted to a third weight value (such as "0.7" or other positive values) that is less than "1" (the first weight value) and greater than "0.5" (the second weight value), in response to the accumulation speed weight W corresponding to the sub-pixel data in the seventh row and the third column being adjusted to "0.5".

Figure 13:
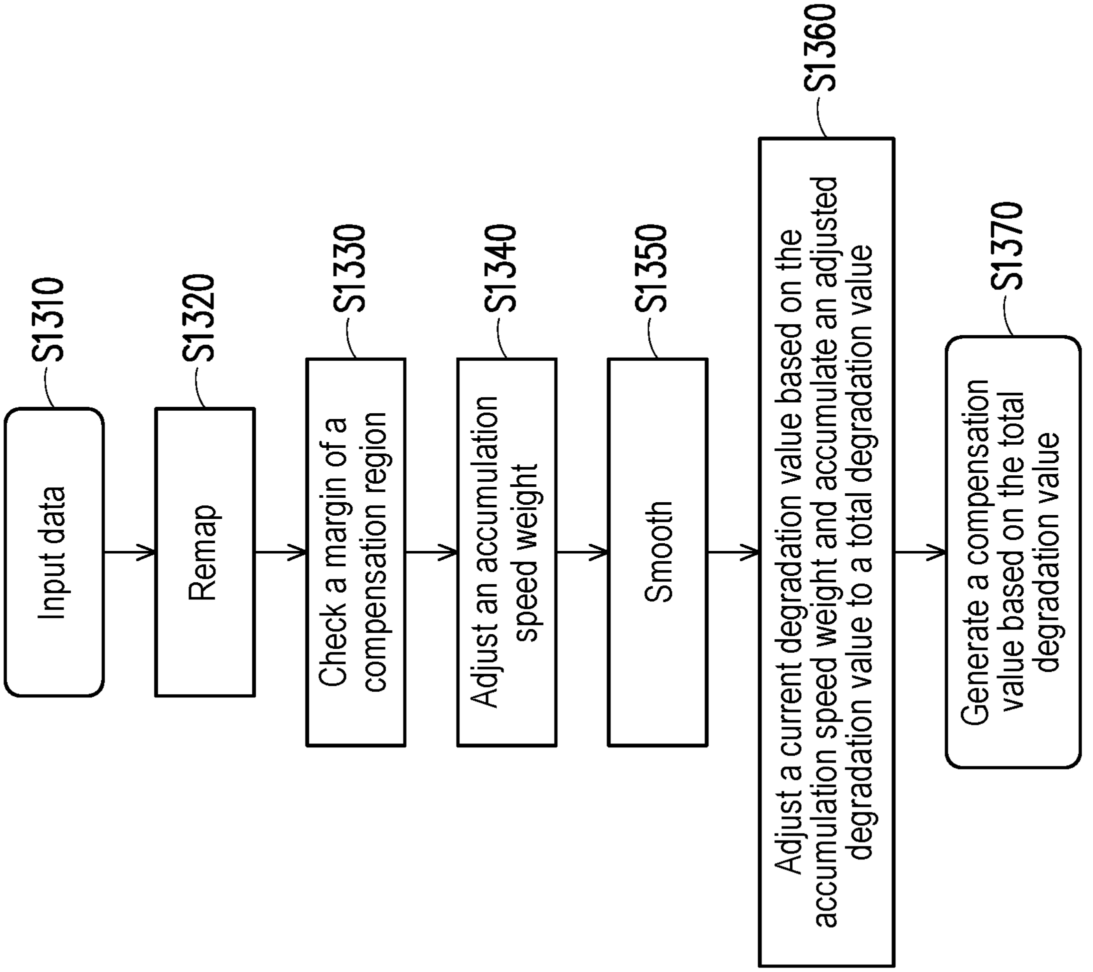
FIG. 13 is a schematic flow diagram of a pixel degradation compensation method according to still another embodiment of the disclosure.

FIG. 13 is a schematic flow diagram of a pixel degradation compensation method according to still another embodiment of the disclosure. For steps S1310, S1320, S1330, S1340, S1360, and S1370 shown in FIG. 13, reference may be made to the relevant descriptions of steps S910, S920, S930, S940, S950, and step S960 shown in FIG. 9, so the details are not repeated here. Please refer to FIG. 8 and FIG. 13. In step S1330, the accumulation speed adjustment circuit 227 may check the margin of the compensation value CV4 in the compensation region CR corresponding to the current sub-pixel data of the sub-pixel data stream D2 to obtain the check result. In step S1340, the accumulation speed adjustment circuit 227 may adjust the accumulation speed weight W corresponding to the current sub-pixel data based on the check result of the compensation value CV4 (the margin of the compensation region CR). The multiplication circuit 222 adjusts the current degradation value DF41 based on the accumulation speed weight W to generate an adjusted degradation value DF42 corresponding to the current sub-pixel data. For step S1350 shown in FIG. 13, reference may be made to step S1150 shown in FIG. 11 and the relevant descriptions of FIG. 12, so the details are not repeated here.

In the implementation example of "local", the accumulation speed weight W corresponding to the different sub-pixel data in the same image frame may be different. In an embodiment, the accumulation speed adjustment circuit 227 may adjust the accumulation speed weight W corresponding to the current sub-pixel data to be the first weight value, in response to the check result indicating that the margin of the compensation value CV4 in the compensation region CR corresponding to the current sub-pixel data is greater than the first threshold value. The first threshold value may be determined according to actual design. The accumulation speed adjustment circuit 227 may adjust the accumulation speed weight W corresponding to the current sub-pixel data to be the second weight value less than the first weight value, in response to the check result indicating that the margin of the compensation value CV4 in the compensation region CR corresponding to the current sub-pixel data is less than the first threshold value. The first weight value and the second weight value may be determined according to actual design. For example, the first weight value is 1, and the second weight value is a positive number less than 1. The accumulation speed weight W corresponding to at least one adjacent sub-pixel data near the current sub-pixel data in the image frame is adjusted to be the third weight value less than the first weight value and greater than the second weight value, in response to the accumulation speed weight W corresponding to the current sub-pixel data being adjusted to the second weight value. For example, referring to FIG. 12, the accumulation speed weight W corresponding to at least one adjacent sub-pixel data near the current sub-pixel data in the image frame is adjusted to the third weight value (such as "0.7" or other positive values) that is less than "1" (the first weight value) and greater than "0.5" (the second weight value), in response to the accumulation speed weight W corresponding to the sub-pixel data in the seventh row and the third column being adjusted to "0.5".

To sum up, the above-mentioned embodiments apply "dynamic decay factor accumulate speed" to overcome the technical issue of color shift in general compensation algorithms. If the accumulation speed weight W is "1" (the accumulation speed is 100%), the sub-pixel degradation may be compensated to return the brightness of the sub-pixel to the target brightness. The above-mentioned embodiments may continuously check the margin of the total degradation value TDF4 in the total degradation value range and/or continuously check the margin of the compensation region CR. Based on the check results, the accumulation speed weight W (the accumulation speed of the degradation value) may be adjusted to slow down the saturation of the compensation region CR (and/or slow down the saturation of the total degradation value range of the total degradation value TDF4). In addition, the pixel degradation compensation circuit may slow down the accumulation speed of the total degradation value (reduce the additional compensation current for the sub-pixel) according to the situation to prolong the life of the sub-pixel.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure shall be defined in the appended claims.

What is claimed is:

1. A processor, comprising:

a processing circuit; and a pixel degradation compensation circuit, coupled to the processing circuit to receive a sub-pixel data stream, for compensating the sub-pixel data stream so as to generate a compensated sub-pixel data stream to a display module, wherein the pixel degradation compensation circuit generates a current degradation value corresponding to current sub-pixel data in the sub-pixel data stream based on the current sub-pixel data, the current degradation value indicates a degradation effect of the current sub-pixel data on a sub-pixel corresponding to the current sub-pixel data in the display module, the pixel degradation compensation circuit selectively adjusts the current degradation value to generate an adjusted degradation value, the pixel degradation compensation circuit accumulates the adjusted degradation value to a total degradation value corresponding to the current sub-pixel data, and the pixel degradation compensation circuit compensates the current sub-pixel data based on the total degradation value corresponding to the current sub-pixel data to generate compensated current sub-pixel data in the compensated sub-pixel data stream to the display module.

2. The processor according to claim 1, wherein a driving value range of the display module is divided into an image region and a compensation region, each sub-pixel data in the sub-pixel data stream belongs to the image region, and the processing circuit remaps an original data stream to the sub-pixel data stream.

3. The processor according to claim 1, wherein an operation of generating the adjusted degradation value comprises:

the pixel degradation compensation circuit checking a margin of the total degradation value in a total degradation value range corresponding to each sub-pixel data in an image frame of the sub-pixel data stream to obtain a check result;

the pixel degradation compensation circuit adjusting an accumulation speed weight corresponding to the current sub-pixel data based on the check result; and the pixel degradation compensation circuit adjusting the current degradation value based on the accumulation speed weight to generate the adjusted degradation value corresponding to the current sub-pixel data.

4. The processor according to claim 3, wherein, the pixel degradation compensation circuit adjusts the accumulation speed weight to be a first weight value, in response to the check result indicating that the margin of the total degradation value in the total degradation value range corresponding to any sub-pixel data in the image frame is greater than a first threshold value; and the pixel degradation compensation circuit adjusts the accumulation speed weight to be a second weight value less than the first weight value, in response to the check result indicating that the margin of the total degradation value in the total degradation value range corresponding to any sub-pixel data in the image frame is less than the first threshold value.

5. The processor according to claim 4, wherein the first weight value is 1, and the second weight value is a positive number less than 1.

6. The processor according to claim 4, wherein, the pixel degradation compensation circuit adjusts the accumulation speed weight to be the second weight value, in response to the check result indicating that the margin of the total degradation value in the total degradation value range corresponding to any sub-pixel data in the image frame is less than the first threshold value and greater than a second threshold value; and the pixel degradation compensation circuit adjusts the accumulation speed weight to be a third weight value less than the second weight value, in response to the check result indicating that the margin of the total degradation value in the total degradation value range corresponding to any sub-pixel data in the image frame is less than the second threshold value.

7. The processor according to claim 4, wherein the same accumulation speed weight is applied to a degradation value corresponding to each sub-pixel data in the image frame.

8. The processor according to claim 3, wherein, the pixel degradation compensation circuit adjusts the accumulation speed weight corresponding to the current sub-pixel data to be a first weight value, in response to the check result indicating that the margin of the total degradation value in the total degradation value range corresponding to the current sub-pixel data is greater than a first threshold value; and the pixel degradation compensation circuit adjusts the accumulation speed weight corresponding to the current sub-pixel data to be a second weight value less than the first weight value, in response to the check result indicating that the margin of the total degradation value in the total degradation value range corresponding to the current sub-pixel data is less than the first threshold value.

9. The processor according to claim 8, wherein, the accumulation speed weight corresponding to at least one adjacent sub-pixel data near the current sub-pixel data in the image frame is adjusted to be a third weight value less than the first weight value and greater than the second weight value, in response to the accumulation speed weight corresponding to the current sub-pixel data being adjusted to the second weight value.

10. The processor according to claim 1, wherein an operation of generating the compensated current sub-pixel data in the compensated sub-pixel data stream comprises:

the pixel degradation compensation circuit generating a compensation value based on the total degradation value corresponding to the current sub-pixel data; and the pixel degradation compensation circuit compensating the current sub-pixel data based on the compensation value to generate the compensated current sub-pixel data to the display module.

11. The processor according to claim 10, wherein a driving value range of the display module is divided into an image region and a compensation region, each sub-pixel data in the sub-pixel data stream belongs to the image region, and the operation of generating the adjusted degradation value comprises:

the pixel degradation compensation circuit checking a margin of the compensation value in the compensation region corresponding to each sub-pixel data in an image frame of the sub-pixel data stream to obtain a check result;

the pixel degradation compensation circuit adjusting an accumulation speed weight corresponding to the current sub-pixel data based on the check result; and the pixel degradation compensation circuit adjusting the current degradation value based on the accumulation speed weight to generate the adjusted degradation value corresponding to the current sub-pixel data.

12. The processor according to claim 11, wherein, the pixel degradation compensation circuit adjusts the accumulation speed weight to be a first weight value, in response to the check result indicating that the margin of the compensation value in the compensation region corresponding to any sub-pixel data in the image frame is greater than a first threshold value; and the pixel degradation compensation circuit adjusts the accumulation speed weight to be a second weight value less than the first weight value, in response to the check result indicating that the margin of the compensation value in the compensation region corresponding to any sub-pixel data in the image frame is less than the first threshold value.

13. The processor according to claim 12, wherein the first weight value is 1, and the second weight value is a positive number less than 1.

14. The processor according to claim 12, wherein, the pixel degradation compensation circuit adjusts the accumulation speed weight to be the second weight value, in response to the check result indicating that the margin of the compensation value in the compensation region corresponding to any sub-pixel data in the image frame is less than the first threshold value and greater than a second threshold value; and the pixel degradation compensation circuit adjusts the accumulation speed weight to be a third weight value less than the second weight value, in response to the check result indicating that the margin of the compensation value in the compensation region corresponding to any sub-pixel data in the image frame is less than the second threshold value.

15. The processor according to claim 12, wherein the same accumulation speed weight is applied to a degradation value corresponding to each sub-pixel data in the image frame.

16. The processor according to claim 11, wherein, the pixel degradation compensation circuit adjusts the accumulation speed weight corresponding to the current sub-pixel data to be a first weight value, in response to the check result indicating that the margin of the compensation value in the compensation region corresponding to the current sub-pixel data is greater than a first threshold value; and the pixel degradation compensation circuit adjusts the accumulation speed weight corresponding to the current sub-pixel data to be a second weight value less than the first weight value, in response to the check result indicating that the margin of the compensation value in the compensation region corresponding to the current sub-pixel data is less than the first threshold value.

17. The processor according to claim 16, wherein, the accumulation speed weight corresponding to at least one adjacent sub-pixel data near the current sub-pixel data in the image frame is adjusted to be a third weight value less than the first weight value and greater than the second weight value, in response to the accumulation speed weight corresponding to the current sub-pixel data being adjusted to the second weight value.

18. The processor according to claim 1, wherein the processing circuit comprises:

an image processing circuit; and a remapping circuit, coupled to the image processing circuit to receive an original data stream, wherein a driving value range of the display module is divided into an image region and a compensation region, each sub-pixel data in the sub-pixel data stream belongs to the image region, and the remapping circuit remaps the original data stream to the sub-pixel data stream.

19. The processor according to claim 1, wherein the pixel degradation compensation circuit comprises:

a degradation value generation circuit, coupled to the processing circuit to receive the sub-pixel data stream, wherein the degradation value generation circuit generates the current degradation value corresponding to the current sub-pixel data based on the current sub-pixel data in the sub-pixel data stream;

a multiplication circuit, coupled to the degradation value generation circuit to receive the current degradation value, wherein the multiplication circuit adjusts the current degradation value to generate the adjusted degradation value corresponding to the current sub-pixel data based on an accumulation speed weight;

a degradation value accumulation circuit, coupled to the multiplication circuit to receive the adjusted degradation value, wherein the degradation value accumulation circuit accumulates the adjusted degradation value corresponding to the current sub-pixel data to the total degradation value corresponding to the current sub-pixel data;

an accumulation speed adjustment circuit, coupled to the degradation value accumulation circuit to receive the total degradation value, wherein the accumulation speed adjustment circuit adjusts the accumulation speed weight to the multiplication circuit based on the total degradation value;

a compensation value circuit, coupled to the degradation value accumulation circuit to receive the total degradation value, wherein the compensation value circuit generates a compensation value corresponding to the current sub-pixel data based on the total degradation value; and a compensation circuit, coupled to the processing circuit to receive the sub-pixel data stream, and coupled to the compensation value circuit to receive the compensation value, wherein the compensation circuit compensates the current sub-pixel data to generate the compensated current sub-pixel data to the display module based on the compensation value.

20. The processor according to claim 1, wherein the pixel degradation compensation circuit comprises:

a degradation value generation circuit, coupled to the processing circuit to receive the sub-pixel data stream, wherein the degradation value generation circuit generates the current degradation value corresponding to the current sub-pixel data based on the current sub-pixel data in the sub-pixel data stream;

a multiplication circuit, coupled to the degradation value generation circuit to receive the current degradation value, wherein the multiplication circuit adjusts the current degradation value to generate the adjusted degradation value corresponding to the current sub-pixel data based on an accumulation speed weight;

a degradation value accumulation circuit, coupled to the multiplication circuit to receive the adjusted degradation value, wherein the degradation value accumulation circuit accumulates the adjusted degradation value corresponding to the current sub-pixel data to the total degradation value corresponding to the current sub-pixel data;

a compensation value circuit, coupled to the degradation value accumulation circuit to receive the total degradation value, wherein the compensation value circuit generates a compensation value corresponding to the current sub-pixel data based on the total degradation value;

an accumulation speed adjustment circuit, coupled to the compensation value circuit to receive the compensation value, wherein the accumulation speed adjustment circuit adjusts the accumulation speed weight to the multiplication circuit based on the compensation value; and a compensation circuit, coupled to the processing circuit to receive the sub-pixel data stream, and coupled to the compensation value circuit to receive the compensation value, wherein the compensation circuit compensates the current sub-pixel data to generate the compensated current sub-pixel data to the display module based on the compensation value.

21. A pixel degradation compensation method, comprising:

generating a current degradation value corresponding to a current sub-pixel data in a sub-pixel data stream based on the current sub-pixel data, wherein the current degradation value represents a degradation effect of the current sub-pixel data on a sub-pixel corresponding to the current sub-pixel data in a display module;

selectively adjusting the current degradation value to generate an adjusted degradation value;

accumulating the adjusted degradation value to a total degradation value corresponding to the current sub-pixel data; and compensating the current sub-pixel data based on the total degradation value corresponding to the current sub-pixel data to generate compensated current sub-pixel data in a compensated sub-pixel data stream to the display module.

22. The pixel degradation compensation method according to claim 21, wherein a driving value range of the display module is divided into an image region and a compensation region, each sub-pixel data in the sub-pixel data stream belongs to the image region, and the pixel degradation compensation method further comprises:

remapping an original data stream to the sub-pixel data stream.

23. The pixel degradation compensation method according to claim 21, wherein the operation of generating the adjusted degradation value comprises:

checking a margin of the total degradation value in a total degradation value range corresponding to each sub-pixel data in an image frame of the sub-pixel data stream to obtain a check result;

adjusting an accumulation speed weight corresponding to the current sub-pixel data based on the check result; and adjusting the current degradation value based on the accumulation speed weight to generate the adjusted degradation value corresponding to the current sub-pixel data.

24. The pixel degradation compensation method according to claim 23, further comprising:

adjusting the accumulation speed weight to be a first weight value, in response to the check result indicating that the margin of the total degradation value in the total degradation value range corresponding to any sub-pixel data in the image frame is greater than a first threshold value; and adjusting the accumulation speed weight to be a second weight value less than the first weight value, in response to the check result indicating that the margin of the total degradation value in the total degradation value range corresponding to any sub-pixel data in the image frame is less than the first threshold value.

25. The pixel degradation compensation method according to claim 24, wherein the first weight value is 1, and the second weight value is a positive number less than 1.

26. The pixel degradation compensation method according to claim 24, further comprising:

adjusting the accumulation speed weight to be the second weight value, in response to the check result indicating that the margin of the total degradation value in the total degradation value range corresponding to any sub-pixel data in the image frame is less than the first threshold value and greater than a second threshold value; and adjusting the accumulation speed weight to be a third weight value less than the second weight value, in response to the check result indicating that the margin of the total degradation value in the total degradation value range corresponding to any sub-pixel data in the image frame is less than the second threshold value.

27. The pixel degradation compensation method according to claim 24, wherein the same accumulation speed weight is applied to a degradation value corresponding to each sub-pixel data in the image frame.

28. The pixel degradation compensation method according to claim 23, further comprising:

adjusting the accumulation speed weight corresponding to the current sub-pixel data to be a first weight value, in response to the check result indicating that the margin of the total degradation value in the total degradation value range corresponding to the current sub-pixel data is greater than a first threshold value; and adjusting the accumulation speed weight corresponding to the current sub-pixel data to be a second weight value less than the first weight value, in response to the check result indicating that the margin of the total degradation value in the total degradation value range corresponding to the current sub-pixel data is less than the first threshold value.

29. The pixel degradation compensation method according to claim 28, further comprising:

adjusting the accumulation speed weight corresponding to at least one adjacent sub-pixel data near the current sub-pixel data in the image frame to be a third weight value less than the first weight value and greater than the second weight value, in response to the accumulation speed weight corresponding to the current sub-pixel data being adjusted to the second weight value.

30. The pixel degradation compensation method according to claim 21, wherein the operation of generating the compensated current sub-pixel data in the compensated sub-pixel data stream comprises:

generating a compensation value based on the total degradation value corresponding to the current sub-pixel data; and compensating the current sub-pixel data based on the compensation value to generate the compensated current sub-pixel data to the display module.

31. The pixel degradation compensation method according to claim 30, wherein a driving value range of the display module is divided into an image region and a compensation region, each sub-pixel data in the sub-pixel data stream belongs to the image region, and the operation of generating the adjusted degradation value comprises:

checking a margin of the compensation value in the compensation region corresponding to each sub-pixel data in an image frame of the sub-pixel data stream to obtain a check result;

adjusting an accumulation speed weight corresponding to the current sub-pixel data based on the check result; and adjusting the current degradation value based on the accumulation speed weight to generate the adjusted degradation value corresponding to the current sub-pixel data.

32. The pixel degradation compensation method according to claim 31, further comprising:

adjusting the accumulation speed weight to be a first weight value, in response to the check result indicating that the margin of the compensation value in the compensation region corresponding to any sub-pixel data in the image frame is greater than a first threshold value; and adjusting the accumulation speed weight to be a second weight value less than the first weight value, in response to the check result indicating that the margin of the compensation value in the compensation region corresponding to any sub-pixel data in the image frame is less than the first threshold value.

33. The pixel degradation compensation method according to claim 32, wherein the first weight value is 1, and the second weight value is a positive number less than 1.

34. The pixel degradation compensation method according to claim 32, further comprising:

adjusting the accumulation speed weight to be the second weight value, in response to the check result indicating that the margin of the compensation value in the compensation region corresponding to any sub-pixel data in the image frame is less than the first threshold value and greater than a second threshold value; and adjusting the accumulation speed weight to be a third weight value less than the second weight value, in response to the check result indicating that the margin of the compensation value in the compensation region corresponding to any sub-pixel data in the image frame is less than the second threshold value.

35. The pixel degradation compensation method according to claim 32, wherein the same accumulation speed weight is applied to a degradation value corresponding to each sub-pixel data in the image frame.

36. The pixel degradation compensation method according to claim 31, further comprising:

adjusting the accumulation speed weight corresponding to the current sub-pixel data to be a first weight value, in response to the check result indicating that the margin of the compensation value in the compensation region corresponding to the current sub-pixel data is greater than a first threshold value; and adjusting the accumulation speed weight corresponding to the current sub-pixel data to be a second weight value less than the first weight value, in response to the check result indicating that the margin of the compensation value in the compensation region corresponding to the current sub-pixel data is less than the first threshold value.

37. The pixel degradation compensation method according to claim 36, further comprising:

adjusting the accumulation speed weight corresponding to at least one adjacent sub-pixel data near the current sub-pixel data in the image frame to be a third weight value less than the first weight value and greater than the second weight value, in response to the accumulation speed weight corresponding to the current sub-pixel data being adjusted to the second weight value.

* * * * *